United States Patent [19]
Ci et al.

[11] Patent Number: 5,908,877
[45] Date of Patent: Jun. 1, 1999

[54] WATER-DISPERSIBLE POWDER COMPOSITION FOR WATER-RESISTANT COATINGS

[76] Inventors: Xiaohong Ci, 1206 Scobee Dr., Lansdale, Pa. 18446; David RIchard Amick, 186 Pine Valley Rd., Doylestown, Pa. 18901; Richard Foster Merritt, 18 Shelley Ln., Fort Washington, Pa. 19034

[21] Appl. No.: 08/852,303

[22] Filed: May 7, 1997

Related U.S. Application Data

[63] Continuation of application No. 08/369,435, Jan. 6, 1995, abandoned.

[51] Int. Cl.$^6$ ........................................................ C08F 8/00
[52] U.S. Cl. ...................... 523/201; 427/385.5; 427/386; 427/388.4; 427/393.6; 524/802; 524/803; 524/832; 525/61; 525/113; 525/119; 525/902
[58] Field of Search ........................ 523/201; 427/385.5, 427/386, 388.4, 396.6; 524/802, 803, 832; 525/61, 113, 119, 902

[56] References Cited

U.S. PATENT DOCUMENTS

| | | | |
|---|---|---|---|
| 3,210,208 | 10/1965 | Grass, Jr. et al. | 525/103 |
| 3,900,440 | 8/1995 | Ohara | 523/410 |
| 3,950,302 | 4/1976 | Rauterkusm, et al. | 524/555 |
| 4,120,839 | 10/1978 | Emmons et al. | 526/317 |
| 4,308,185 | 12/1981 | Evans et al. | 525/530 |
| 4,346,144 | 8/1982 | Craven | 428/335 |
| 4,386,172 | 5/1983 | Yoshioka et al. | 523/408 |
| 4,581,395 | 4/1986 | Nakaya et al. | 523/410 |
| 4,704,416 | 11/1987 | Eck et al. | 524/17 |
| 4,889,890 | 12/1989 | Kerr et al. | 525/113 |
| 5,252,636 | 10/1993 | Ellenberger et al. | 523/401 |
| 5,342,897 | 8/1994 | Franzman et al. | 525/221 |
| 5,403,894 | 4/1995 | Tsai et al. | 525/285 |

FOREIGN PATENT DOCUMENTS

| | | |
|---|---|---|
| 601518 | 12/1993 | European Pat. Off. . |
| 2166126 | 6/1990 | Japan . |

*Primary Examiner*—Rachel Gorr
*Attorney, Agent, or Firm*—Kevin F. Gironda; James G. Vouros

[57] ABSTRACT

A water dispersible powder composition is provided. The powder composition contains at least one film-forming polymer having at least one functional group and at least one reactive component that reacts to form a non-ionic bond with the polymer functional group following dispersion of the powder composition in water. The reaction between the polymer particles in the admixture and the reactive component renders the resulting coating water-resistant. The powder composition of this invention is useful for producing water-resistant coatings.

7 Claims, No Drawings

WATER-DISPERSIBLE POWDER COMPOSITION FOR WATER-RESISTANT COATINGS

This is a continuation, of application Ser. No. 08/369,435 filed Jan. 6, 1995, now abandoned.

The present invention relates to a water-dispersible powder composition for use in water-resistant films and coatings. Dry powder compositions are particularly important in coatings because they can be more easily stored and transported than their liquid counterparts.

One attempt to obtain water-resistant films from a water-dispersible powder is disclosed in U.S. Pat. No. 5,342,897 to Franzman, et al. Franzman discloses a polymer powder comprising a dispersion polymer and a water soluble polymer which is readily re-dispersed in water. When used with mineral containing building materials, the acid anions in the water soluble polymer react with calcium and aluminum cations to form insoluble compounds which impart water-resistance to coatings.

The problem with water-dispersible polymer powders is that the technology which provides good water-dispersibility of the powders also leads to poor water resistance in the resultant films. The polymer powders in Franzman form insoluble compounds only when used in the presence of metal cations, but otherwise suffer from poor water-resistance.

We have found that a water-dispersible polymer powder composition can be obtained which produces films having good water resistance, without the need for metal cations. The polymer powder composition contains at least one reactive component which typically reacts with a film-forming functionalized polymer to form a non-ionic bond following dispersion of the powder composition in water. This reaction renders the resultant films less water-dispersible, thus increasing the water-resistance.

In the first aspect of the present invention, there is provided a powder composition comprising a water dispersible admixture of:

a) film-forming polymer particles having at least one functional group; and b) at least one reactive component that forms a non-ionic bond with said polymer functional group following dispersion of the admixture in water.

In a second aspect of the present invention, there is provided a method for producing a water-resistant coating from a dispersible powder composition comprising a) admixing
film-forming polymer particles having at least one functional group; and
at least one reactive component that forms a non-ionic bond with said polymer functional group following dispersion in water;

b) dispersing the admixture in water;

c) applying the admixture dispersion to a substrate; and d) drying said admixture dispersion to form the water-resistant coating.

In a third aspect of the present invention, there is provided a dry formulation for the preparation of ready-to-use coatings containing a water-dispersible powder as described in the first aspect.

This invention is directed to a water-dispersible powder composition which is an admixture of two or more reactive elements, at least one element being (a) film-forming polymer particles with at least one functional group and a second element being (b) a reactive component that forms a non-ionic bond with the polymer functional group upon dispersion in water. The reaction between functional groups on the polymer particles and the reactive components occurs following dispersion of the powder in water. The reaction renders the resultant coating water-resistant and also imparts to the coating solvent resistance, chemical resistance, abrasion resistance and durability.

The polymer particles of this invention are film-forming and have at least one functional group. The polymer particles may be mixtures of different polymer compositions with the same or different reactive groups. The functional group can provide for dispersibility of the polymer particle in water and can react with the reactive component upon dispersion in water. The polymer particles may be homopolymers or co-polymers, single or multi-staged. They may be synthesized by any known polymerization technique, including, for example, emulsion polymerization, solution polymerization and suspension polymerization in aqueous or non-aqueous media. Polymer particles useful in the present invention are not limited to any particle size, molecular weight, glass transition temperature (Tg), chemistry, or physical shape.

Film-forming polymers useful in this invention are those which are film-forming after dispersion of the powder composition in water. One component of the polymer particle will preferably have a glass transition temperature below 50° C. Polymers with a higher glass transition temperature are also useful in this invention with sufficient coalescent or heat to render them film-forming.

As used herein, polymer particle "functional group" means an atom or group of atoms attached to a carbon atom and whose presence as a unit imparts characteristic properties to the polymer particle. The functional group in this invention aids in water-dispersibility of the polymer particle. Preferred polymer particle functional groups are carboxyl, hydroxyl, carboxylamide and amine.

Monomers useful in the polymerization of the film-forming polymer particles include alkyl acrylates and alkylmethacrylates; acrylamide or substituted acrylamides; styrene or substituted styrenes; butadiene; vinyl acetate and other vinyl esters; vinyl monomers such as vinyl chloride, vinylidene chloride, N-vinyl pyrollidone; acrylonitrile or methacrylonitrile; and ethylene. Low levels of copolymerized ethylenically-unsaturated acid monomers, in the range of 0.1% to 25%, may also be used. Preferred polymer particles are multistage, core-shell polymers formed by conventional sequential emulsion polymerization known to those skilled in the art. The emulsions are neutralized to a pH of about 8 to 9 and have a solids level in the range of 35% to 40%. An example of a suitable process is described in EP 0522791 A1. Preferred polymer particles useful in this invention are formed from a first stage or shell of about 80% methyl methacrylate and about 20% methacrylic acid with a low level, on the order of 0.5% to 5%, of a multifunctional crosslinking monomer such as, for example, allyl methacrylate. Once the first stage polymerization is complete the polymer emulsion is neutralized with a suitable base or combinations of suitable bases such as, for example, ammonium hydroxide, sodium hydroxide, calcium hydroxide, potassium hydroxide or combinations thereof. Following this neutralization, the second stage or core polymer is formed, preferably from about a 50% butyl acrylate and 50% methyl methacrylate.

A functional group may be incorporated on the polymer particle by any conventional method. One method, for example, is the incorporation of a functional monomer into the polymer particle. Another method is by an in-process or post-addition adsorption or grafting of a functional group onto the polymer particle via additives. Additives useful for this purpose include, for example, protective colloids such as, for example, polyvinyl alcohol, polycarboxylic acid, polyvinyl pyrrolidone, polyalkylene oxides, cellulosics, starches and amines.

The polymer particles of this invention can be made into a dry powder by any conventional method known in the art. Such methods include, for example, precipitation, freeze drying, reduced pressure drying, coagulation, fluid bed drying and spray drying. Preferably spray drying is used to produce the dry powder. Spray drying may be carried out under atmospheric or reduced pressure at from 100° C. to 400° C. and is often carried out in the presence of an anti-caking agent, such as for example 3% calcium carbonate by weight of polymer. Preferred polymer particles are free-flowing and have a particle size of 1 to 100 microns.

The reactive component in the admixture must be dispersible or soluble in water. It may be a mixture of different reactive components with the same or different reactive groups. The reactive component contains at least one reactive group, which reacts to form a non-ionic bond with the functional group on the polymer particles following dispersion of the admixture in water. The reaction proceeds in a time-frame allowing film-formation to occur. The reaction between the dispersed polymer functional group and the reactive component may be in the form of a chemical reaction or a physical interaction such as crystallization. A preferred embodiment of the invention involves a cross-linking reaction, such as, for example, crosslinking carboxyl polymer functionality with epoxides. The crosslinking reaction produces coatings which are water resistant and also tough and durable.

The reactive component may be polymeric or non-polymeric. Reactive components useful in the present invention are not limited to any particle size, molecular weight, chemical functionality, volatility or physical shape.

Some of the reactive components may be commercially available as a dry powder. Other reactive components may be made into dry powder by any conventional method such as, for example, precipitation, freeze drying, reduced pressure drying, coagulation, fluid bed drying, spray drying and physical adsorption onto an inert filler such as, for example, calcium carbonate, clay, talc or silica.

Suitable reactive functional pairs useful in this invention include for example:
  (a) In the case wherein the polymer functional group is carboxyl, the reactive component reactive group may be, for example any one or more of the following:
    1) epoxide
    2) organohalide
    3) aziridine
    4) carbodiimide
    5) oxazoline
    6) alcohol
    7) amine
    8) aminosilane
    9) silicon compounds including organosilicone compounds
    10) amine formaldehydes
  (b) In the case wherein the polymer functional group is hydroxyl, the reactive component reactive group may be, for example any one or more of the following:
    1) titanium compounds
    2) boron compounds
    3) isocyanates
    4) carboxylic acids and esters
    5) amine formaldehydes
    6) silicon compounds including organosilicone compounds
    7) aldehydes
    8) oxidants which generate aldehydes or ketones, such as, for example periodates and perborates.

The film-forming polymer particles and reactive component of this invention can be blended in a liquid state prior to powder formation, provided the reaction between the reactive component and polymer functional group has not progressed significantly to interfere with redispersion of the admixture or the subsequent film formation. Preferably, the film-forming polymer particles and reactive component are formed separately into dry powders. The individual dry powders are then admixed into the dry powder composition of this invention.

The functional polymer particles and reactive component may be admixed by any conventional means. The polymer particle functional groups and reactive component reactive groups are preferably present in the powder composition at a mole ratio range from between one to ten (1:10), and ten to one (10:1). The powder composition obtained is readily dispersible in water. Preferably the admixed powder composition is storage stable at room temperature. Water is added to the dry powder composition shortly before use, thoroughly mixed and the mixture is processed in a conventional manner. Subsequent to dispersion in water the reactive component and polymer functional group react. The resultant film is water-resistant.

The powder composition may optionally include other dry conventional additives such as, for example, fillers, sand, chips for aggregate finish, pigments, coalescent, thickeners, dispersants and formulation additives in conventional amounts.

The composition of this invention is useful wherever water-resistance is desired in a coating made from a dispersible powder. This invention is particularly useful in ready-to-use coatings for cementitious and non-cementitious applications, especially in masonry coatings, paints, adhesives, caulks, mastics, floor polishes and paper. A water-resistant coating may be produced by dispersing the powder composition of this invention in water, applying the admixture dispersion to a substrate and allowing the coating composition to dry. A preferred embodiment of the invention is a coating that is curable at ambient conditions of temperature, relative humidity and air velocity, the temperature being greater than 0° C., in that the composition is formulated in an aqueous composition.

Test Methods

1. Scrub Resistance Test:

Powder compositions were formulated according to the paint formulation below:

| Powder paint formulation 1 | |
| --- | --- |
| Material | Weight by Part (grams) |
| Dry Polymer Powder | 46.0 |
| Reactive component (1) | 0 to 19.2 |
| $TiO_2$ | 20 |
| Defoamer | 0.5 |
| Calcium carbonate | 60 |
| Defoamer | 0.4 |
| Clay | 1.0 |

-continued

| Powder paint formulation 1 | |
|---|---|
| Material | Weight by Part (grams) |
| Caprolactam | 3.2 |
| Dispersant | 0.8 |
| Thickener | 0.6 |
| TOTAL | 160.5 |
| Water | 96.4 |

(1) The amount of reactive component was varied from 0 (comparative) to 19.2 grams as described in the Samples below.

All of the dry ingredients were added to a plastic pint cup, the cup capped and placed on a paint shaker for 2 minutes to blend the dry components. Water was added to the paint composition and stirred on a laboratory mechanical stirrer for 40 to 45 minutes, then allowed to rest for 15 to 20 minutes before use.

7-mil films of each sample from paint formulation 1 were drawn on a black scrub test panel (The Leneta Company, Form P121-10N) with a Dow applicator. The paints were allowed to cure for 7 or 28 days at 25° C. and 50 percent relative humidity.

Abrasive scrub resistance was determined by placing the scrub panel on a Gardner Scrubability and Abrasion Tester (Gardner Company) with a ten mil by one-half inch by six and one half inch shim. To the brush was added 10.0±0.2 grams of standardized scrub medium (Type SC-2, The Leneta Company) and 5 ml. of water. Reapplication of the scrub medium and water occurred after every 400 scrub cycles. The paint was scrubbed until a break through to substrate was observed across the width of the shim. All paints were scrubbed in duplicate and the results averaged.

A modified scrub test of DIN 53778, referred to hereafter as the Scrub Test (DIN), was also performed. One paint film of about 1.4 mils was tested for each formulation. The paint films were cured for 28 days at 25° C. and 50 percent relative humidity. The paint films were scrubbed with the specified soap solution, 0.25% sodium dodecylbenzene sulfonate (DS-4), until 2 of the 3 inside bristle tracks showed wear through to the substrate in the center section of the panel or until 3000 scrub cycles had occurred.

2. Wet Abrasion Test:

Powder compositions were formulated according to the paint formulation below:

| Powder paint formulation 2 | |
|---|---|
| Material | Weight by Part (gram) |
| Dry Powder Composition | 57.5 |
| Defoamer | 0.5 |
| $TiO_2$ | 25 |
| Calcium carbonate | 75 |
| Clay | 1.25 |
| Thickener | 0.75 |
| TOTAL | 160.5 |
| DI Water | 120 |

10 mil wet films of the test coating were drawn out over Leneta Black Vinyl Scrub Test Panels (Form P121-10N). The films were cured at 70° C. and 50% relative humidity for 7 and 56 days. The samples were tested using a Gardner Scrubability and Abrasion Tester (Gardner Co.) as follows:

a) The cured films on Leneta Black Vinyl Scrub Panels were placed coating side up, centered and taped onto the aluminum plate of the Abrasion Tester.

b) The brush was soaked in water overnight before use. The brush was removed from the water, shaken vigorously to remove excess water and mounted in the brush holder. 10 grams of Abrasive Scrub Medium, Type SC-2 (The Leneta Company) were spread evenly on the brush bristles.

c) The Abrasion Tester was run at 37±1 cycles/minute. After each 500 cycles, 10 ml of water was added to the sample and 10 grams of Scrub Medium to the brush.

d) Testing continues until failure. Failure was noted when the coating was eroded through to the black panel and the number of scrub cycles to failure was recorded.

3. Mechanical Property Test:

Polymer films were made from the redispersed powder composition and cured for 4 weeks at 700° C. and 50% relative humidity. The films were soaked in deionized water at room temperature for one week and subsequently tested in the wet state. Mechanical properties of the films were measured on an Instron testing machine at crosshead speed of 0.5 inch/minute with dogbone shaped specimens (0.725 inch gauge length) clamped on the ears (ASTM Test Method D-412). Engineering values of loads and % elongation were recorded respectively. True tensile strength and true elongation of film were calculated from engineering values (equation 1 and 2) with film thickness correction.

Equation 1 $T_{true\ strength} = T_{engineering\ strength}(\Delta L/L_0 + 1)$

Equation 2 $E_{true\ elongation} = Ln\ (\Delta L/L_0 + 1)$ $\Delta L$ is $E_{engineering\ elongation}$

EXAMPLE 1

Sample A

Sample A consists of a polymer powder without any reactive component. The polymer powder composition has a 78.6% methyl methacrylate: 19.9% methacrylic acid: 1.5% allyl methacrylate polymer shell and a 50.8% butyl acrylate: 49.2% methylmethacrylate core.

Sample B

Sample B consists of the polymer powder of Sample A plus reactive components phenyl glycidyl ether and dimethylbenzyl amine. The reactive components were added to the composition in the following manner: 4.8 grams of phenyl glycidyl ether was diluted to 30 grams with methylene chloride. This was added to 30 grams of calcium carbonate. The calcium carbonate was spread in a glass dish and placed under a nitrogen stream overnight. The powder was ground with a mortar and pestle and 23.2 grams added to the other dry components. This is equivalent to 20 grams of calcium carbonate and 3.2 grams of phenyl glycidyl ether. 0.9 grams of dimethylbenzyl amine was diluted to 30 grams with methylene chloride. This was poured onto 30 grams of $TiO_2$, spread in a glass dish and placed under a nitrogen stream overnight. The powder was ground with a mortar and pestle and 20.6 grams added to the other dry components. This is equivalent to 20 grams of $TiO_2$ and 0.6 grams of dimethylbenzyl amine.

Sample C

Sample C consists of the polymer powder of Sample A plus an epoxy reactive component. The reactive component was added to the composition in the following manner. To 90 grams of calcium carbonate was added 28.8 grams of a water dispersible epoxy resin (EPI-REZ 3510W60, Shell Chemicals—60% solids). The mixture was spread on aluminum foil and allowed to dry overnight. The dry powder was ground with a mortar and pestle and 71.5 grams was used in the dry paint mixture. This is equivalent to 11.5 grams of EPI-REZ 3510W60 solids and 60 grams of calcium carbonate.

Sample D

Sample D consists of the polymer powder of Sample A plus an amine and an epoxy reactive component. The reactive components were added to the composition in the following manner. To 90 grams of calcium carbonate was added 16.8 grams of a water dispersible epoxy resin (EPI-REZ 3510W60, Shell Chemicals—60% solids). The mixture was spread on aluminum foil and allowed to dry overnight. The dry powder was ground with a mortar and pestle. 66.7 grams was used in the dry paint mixture. This is equivalent to 6.7 grams of EPI-REZ 3510W60 solids and 60 grams of calcium carbonate. 3.45 grams of Jeffamine T403 was diluted to 30 grams with methylene chloride. This was poured onto 30 grams of $TiO_2$, spread in a glass dish and places under a nitrogen stream overnight. The powder was ground with a mortar and pestle. 22.3 grams of the Jeffamine powder was added to the other dry components. This is equivalent to 20 grams of $TiO_2$ and 2.3 grams of Jeffamine T-403.

Each sample was formulated into powder paint formulation 1 and the formulation was then tested in the Scrub Resistance Test and DIN test with the results shown in Table 1. The results show increased water-resistance, as measured by an increase in the scrubs to failure, for powder compositions of the present invention.

TABLE 1

| | Cycles to failure | | |
|---|---|---|---|
| Sample | 7-day cure | 28-day cure | DIN test |
| A (polymer only) (Comparative) | 21 | 26 | 80 |
| B (polymer + phenyl glycidyl ether + dimethylbenzyl amine) | 56 | 72 | 615 |
| C (polymer + epoxy) | 83 | 215 | >3000 |
| D (polymer + Jeffamine + epoxy) | 333 | 664 | >3000 |

EXAMPLE 2

Each of the following samples was formulated according to powder paint formulation 2 and tested in the Wet Abrasion Test.

Sample E

Sample E dry powder composition consists of the polymer powder of Sample A without any reactive component.

Sample F

Sample F dry powder composition consists of the polymer powder of Sample E plus amine and epoxy. The amine was added to the polymer powder by co-spray-drying the polymer emulsion with 5% Jeffamine T-403 (polyoxypropylenetriamines, Huntsman Corp) based on the weight of dry polymer. This produced a free-flowing white powder having a residual moisture level of about 2.0% and particle size range between 1 and 75 microns.

A dry powder epoxy reactive component was formed separately. This was done by adding to a 30–35% slurry of calcium carbonate in water, 20% of a water dispersible epoxy resin (EPI-REZ 3510W60, Shell Chemicals). This slurry was then spray-dried using a Bowen Model BLSA laboratory spray dryer. Inlet air temperature was adjusted to 117° C. and outlet air temperature was 55° C. to 60° C. as regulated by feed rate to yield a free flowing fine powder. No anti-caking agent was added.

The polymer powder with Jeffamine T-403 and the epoxy reactive component on calcium carbonate were admixed by placing both powders in a bottle and shaking until the particles were uniformly distributed. The functional group ratio in the powder composition of Jeffamine T-403 to Epoxy was 3.5. The blended powders were storage stable at 25° C. for four months and at 50° C. for two weeks.

The results, listed in Table 2, demonstrate improved water-resistance for the powder composition containing the reactive component. The improvement is evidenced by an increase in the number of cycles needed for failure.

TABLE 2

| | Cycles to failure | |
|---|---|---|
| Sample | 7-day cure | 56-day cure |
| E (polymer only) (Comparative) | 21 | 230 |
| F (polymer + Jeffamine + Epoxy) | 255 | 1300 |

EXAMPLE 3

Each of the following powder compositions were tested in the Mechanical Property Test. The results are shown in Table 3.

Sample G

Sample G dry powder composition consists of the polymer powder of Sample A without any reactive component.

Sample H

Sample H dry powder composition consists of the polymer powder of Sample G, admixed with the dry powder epoxy reactive component of Sample F at 3.2% based on polymer solids (no Jeffamine).

Sample I

Sample I dry powder composition consists of the dry powder composition described of Sample F (polymer, Jeffamine T403 and Epoxy).

The results demonstrate that a polymer film formed from polymer particles alone has such poor water resistance that it dissolves. Films formed from powder compositions containing reactive components have good water resistance.

TABLE 3

| | True Tensile Strength (psi) | | True Elongation (%) | |
|---|---|---|---|---|
| Sample | Dry | Wet | Dry | Wet |
| G (polymer only) (Comparative) | shattered | dissolved | — | — |
| H (polymer + Jeffamine + Epoxy) | 2012 ± 156 | 1664 ± 178 | 5.10 ± 0.22 | 4.71 ± 0.53 |
| I (polymer + Epoxy) | 909 ± 132 | 522 ± 80 | 4.8 ± 0.13 | 4.98 ± 0.10 |

EXAMPLE 4

Each of the following samples was formulated into powder paint formulation 1 and tested in the Scrub Resistance Test with the results listed in Table 4.

Sample J

Sample J consists of a polyvinyl alcohol functional polymer powder (Airflex RP-245, Air Products) without any reactive component.

Sample K

Sample K consists of the polyvinyl alcohol functional polymer powder Airflex RJP-245 of Sample J and an isocyanate reactive component. The reactive component was formed by adding 10.2 grams of water-soluble isocyanate (Bayhydur XP-7063) to 60 grams of calcium carbonate in a plastic pint cup. This was placed on a paint shaker for 2 minutes.

As demonstrated by increased cycles to failure, water-resistance increased when the polymer powder was combined with a reactive component.

TABLE 4

| Sample | Cycles to failure | |
|---|---|---|
| | 7-day cure | 28-day cure |
| J (polymer only) (Comparative) | | 385 |
| K (polymer + isocyanate) | 381 | 557 |

What is claimed is:

1. A non-cementitious coating powder composition comprising water dispersible admixture of:
   a) a first dry powder comprising film-forming polymer particles synthesized by emulsion polymerization, having at least one functional group; and
   b) a second dry powder comprising at least one reactive component that forms a non-ionic bond with said polymer functional group following dispersion of the admixture in water, the powder composition being storage stable at room temperature.

2. The powder composition of claim 1 wherein said polymer particle functional groups are selected from the group consisting of hydroxyl, carboxyl, carboxylamine and amine.

3. The powder composition of claim 1 wherein the mole ratio of polymer particle functional groups to reactive groups on the reactive component is in the range of from 0.1 to 10.

4. A method for producing a water-resistant coating from a non-cementitious water dispersible powder composition comprising:
   a) admixing a first dry powder comprising film-forming polymer particles synthesized by emulsion polymerization, having at least one functional group; and
   a second dry powder comprising at least one reactive component that forms a non-ionic bond with said polymer functional group following dispersion of the admixture in water;
   b) dispersing said admixture in water;
   c) applying said admixture dispersion to a substrate; and
   d) drying said admixture dispersion to form the water-resistant coating.

5. The method of claim 4 wherein said admixture dispersion is dried under ambient conditions.

6. A dry paint formulation comprising said powder composition of claim 1.

7. The powder composition of claim 1 wherein said water dispersible powder composition is storage stable at room temperature.

* * * * *